(12) United States Patent
Bansal et al.

(10) Patent No.: US 8,274,893 B2
(45) Date of Patent: Sep. 25, 2012

(54) NETWORK INTERFACE SELECTION USING HISTORICAL CONNECTION INFORMATION

(75) Inventors: Deepak Bansal, Redmond, WA (US); Sumit Garg, Seattle, WA (US); Murari Sridharan, Sammamish, WA (US); David Thaler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 11/818,888

(22) Filed: Jun. 15, 2007

(65) Prior Publication Data

US 2008/0310419 A1 Dec. 18, 2008

(51) Int. Cl.
*G01R 31/08* (2006.01)
*G06F 11/00* (2006.01)
*H04L 12/26* (2006.01)

(52) U.S. Cl. .................................. 370/235; 370/253
(58) Field of Classification Search ................ None
See application file for complete search history.

(56) References Cited

U.S. PATENT DOCUMENTS

| | | | |
|---|---|---|---|
| 5,526,435 A * | 6/1996 | Tsumura | 380/278 |
| 5,943,317 A | 8/1999 | Brabson et al. | |
| 6,064,671 A | 5/2000 | Killian | |
| 6,256,309 B1 | 7/2001 | Daley et al. | |
| 6,560,221 B1 * | 5/2003 | Hara et al. | 370/352 |
| 6,697,333 B1 | 2/2004 | Bawa et al. | |
| 7,039,709 B1 | 5/2006 | Beadle et al. | |
| 2003/0065816 A1 | 4/2003 | Dharmadhikari et al. | |
| 2004/0111529 A1 | 6/2004 | Parmar | |
| 2005/0053046 A1 | 3/2005 | Wang | |
| 2006/0015636 A1 | 1/2006 | Skraba et al. | |
| 2006/0045069 A1 * | 3/2006 | Zehavi et al. | 370/352 |
| 2006/0075124 A1 * | 4/2006 | Dougherty et al. | 709/228 |
| 2006/0098575 A1 * | 5/2006 | Lee | 370/237 |
| 2006/0142021 A1 | 6/2006 | Mueckenheim et al. | |
| 2007/0014241 A1 | 1/2007 | Banerjee et al. | |
| 2007/0030826 A1 | 2/2007 | Zhang et al. | |
| 2007/0047446 A1 | 3/2007 | Dalal et al. | |
| 2007/0067462 A1 * | 3/2007 | Takeda | 709/227 |
| 2007/0110080 A1 * | 5/2007 | Bennett | 370/400 |
| 2008/0081576 A1 * | 4/2008 | Olsen et al. | 455/187.1 |
| 2008/0144511 A1 * | 6/2008 | Marcondes et al. | 370/236 |
| 2008/0159132 A1 * | 7/2008 | Cromer et al. | 370/230 |

FOREIGN PATENT DOCUMENTS

JP 2005-85078 A 3/2005

OTHER PUBLICATIONS

Anderson, D.G., Snoeren, A. C.,and Balakrishnan, H. Best-Path vs. Multi-Path Overlay Routing. *IMC '03*, Oct. 27-29, 2003, Miami Beach, Florida, 10 pgs.

De Launois, C., Bonaventure, O., and Lobelle, M. The NAROS Approach for Ipv6 Multihoming with Traffic Engineering. Universite catholique de Louvain, Department of Computing Science and Engineering. 10 pgs., (2003).

(Continued)

*Primary Examiner* — Gregory Sefcheck
*Assistant Examiner* — Minh-Trang Nguyen

(57) ABSTRACT

A computer may be capable of communicating with devices via network through multiple interfaces. When a new connection is to be established, the computer may select an interface to use for the connection. In some embodiments, the interface may be selected based on historical connection information representing the performance of previous network connections that the computer has established through the interfaces.

20 Claims, 3 Drawing Sheets

OTHER PUBLICATIONS

Goldenberg, D. K., Qiu, L., Xie, H., Yang, Y. R., and Zhang, Y. Optimizing Cost and Performance for Multihoming, Session 3: Multihoming and Overlays. *SIGCOMM '04*, Aug. 30-Sep. 3, 2004, Portland, Oregon, pp. 79-92.

Ylitalo, J., Jokikyyny, T., Kauppinen, T., Tuaminen, A. J., and Laine, J. Dynamic Network Interface Selection in Multihomed Mobile Hosts. In *Proc. 36th Hawaii International Conference on System Sciences*, 2003, pp. 1-10.

International Search Report mailed Nov. 14, 2008 from corresponding International Application No. PCT/US2008/065737.

J. Ylitalo, T. Jokikyyny, T. Kauppinen, A. J. Tuominen and J. Laine, "Dynamic Network Interface Selection in Multihomed Mobile Hosts," 36th Annual Hawaii International Conference on System Sciences (HICSSS'03)—Track 9, pp. 315-325, 2003.

Extended European Search Report, PCT/US2008065737, Jul. 23, 2010.

Extended European Search Report for European Application No. 08780747.5 dated Jul. 23, 2010.

* cited by examiner

NETWORK INTERFACE SELECTION USING HISTORICAL CONNECTION INFORMATION

BACKGROUND

1. Technical Field

The techniques described herein relate to network communication using a computer.

2. Discussion of Related Art

Computers can be configured to communicate with one another over a network connection. The details of a network connection may not be readily apparent to the user. For example, a computer may communicate with a server that could be located nearby or in a different state or country. Communication may take place over different types of media, such as telephone lines, cable lines, fiber optics or radio waves, for example. If the network communication takes place over the Internet, communication may be facilitated by an Internet Service Provider (ISP), which may route the communications through any one of a variety of different network paths.

Some computers may have a variety of different options for how they will access a computer network. For example, a computer may access a network through an Ethernet connection which provides a wired network interface or a wireless network interface card (NIC) that provides a wireless network interface. When a computer has more than one network interface it may choose which interface to use for a connection. One prior technique for choosing a network interface is to select an available interface that has the highest interface data rate. The computer's interfaces may advertise the data rate that they are capable of providing and the computer may select the interface based on the advertised data rates.

SUMMARY

In one aspect, when a computer seeks to establish a new network connection, a network interface may be chosen for the network connection based on the performance of previous network connections through the available interfaces. Applicants have appreciated that, although one interface may have a higher data rate than another interface, in some embodiments using the slower interface may provide better overall performance for the network connection. Historical information about previous connections through multiple interfaces may be used to predict which interface will provide the best overall performance for a new connection. In some embodiments, such historical information may be stored by the computer itself. As the computer makes connections to other computers, one or more performance-related parameters of those connections may be stored and associated with the interface through which they were established. By way of example, such information may include the round-trip time, the connection data rate, the connection loss rate, the hop count for the connection and/or any other suitable information. When a new connection is desired to be established, the computer may access some or all of this stored information to determine which interface to use. As a result, improved connection performance may be achieved by selecting an interface that is most likely to provide the best connection performance.

One embodiment relates to a method for use in a computing environment that includes a first computer configured to communicate via a network through a first network interface and a second network interface. The network may enable the first computer to communicate with a plurality of other computers via the network. The first computer may store first and second historical network connection information. The first historical network connection information may represent a performance of a first network connection between the first computer and at least one of the plurality of other computers through the first network interface. The second historical network connection information may represent a performance of a second network connection between the first computer and at least one of the plurality of other computers through the second network interface. Based on at least the first and second historical network connection information, a network interface may be selected to use for a third network connection from among the first and second network interfaces. Based on the interface selected, a third network connection may be established between the first computer and a second computer from among the plurality of other computers such that third network connection communication passes through the selected network interface.

Another embodiment relates to a computer readable medium for use in a computing environment that includes a first computer configured to communicate via a network through a first network interface and a second network interface. The network may enable the first computer to communicate with a plurality of other computers via the network. The computer readable medium may have instructions recorded thereon which, when executed, perform a method that includes several acts. For example, in response to the execution of the instructions, the computer may store historical network connection information representing a performance of a plurality of network connection between the first computer and at least one of the plurality of other computers through the plurality of network interfaces. A network interface may be selected from among the plurality of network interfaces to use for a network connection between the first computer and at least one of the plurality of other computers. Based on the interface selected, a network connection may be established between the first computer and a second computer from among the plurality of other computers such that communication between the first computer and the second computer passes through the selected network interface.

Yet another embodiment relates to a system that includes a computer and also includes first and second network interfaces that enable the computer to communicate with a plurality of other computers via a network. The computer may include at least one storage device storing first historical network connection information representing a performance parameter of a first network connection between the computer and at least one of the plurality of other computers through the first network interface, and second historical network connection information representing a performance parameter of a second network connection between the computer and at least one of the plurality of other computers through the second network interface. The computer may also include a processor that determines, based on the first and second historical information, which of the first and second network interfaces to use for a third network connection to be established with at least one of the plurality of other computers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF DRAWINGS

In the drawings, each identical or nearly identical component that is illustrated in various figures is represented by a like numeral. For purposes of clarity, not every component may be labeled in every drawing. In the drawings:

FIG. 1 illustrates a computing environment in which embodiments may be implemented.

DETAILED DESCRIPTION

Figure 1:
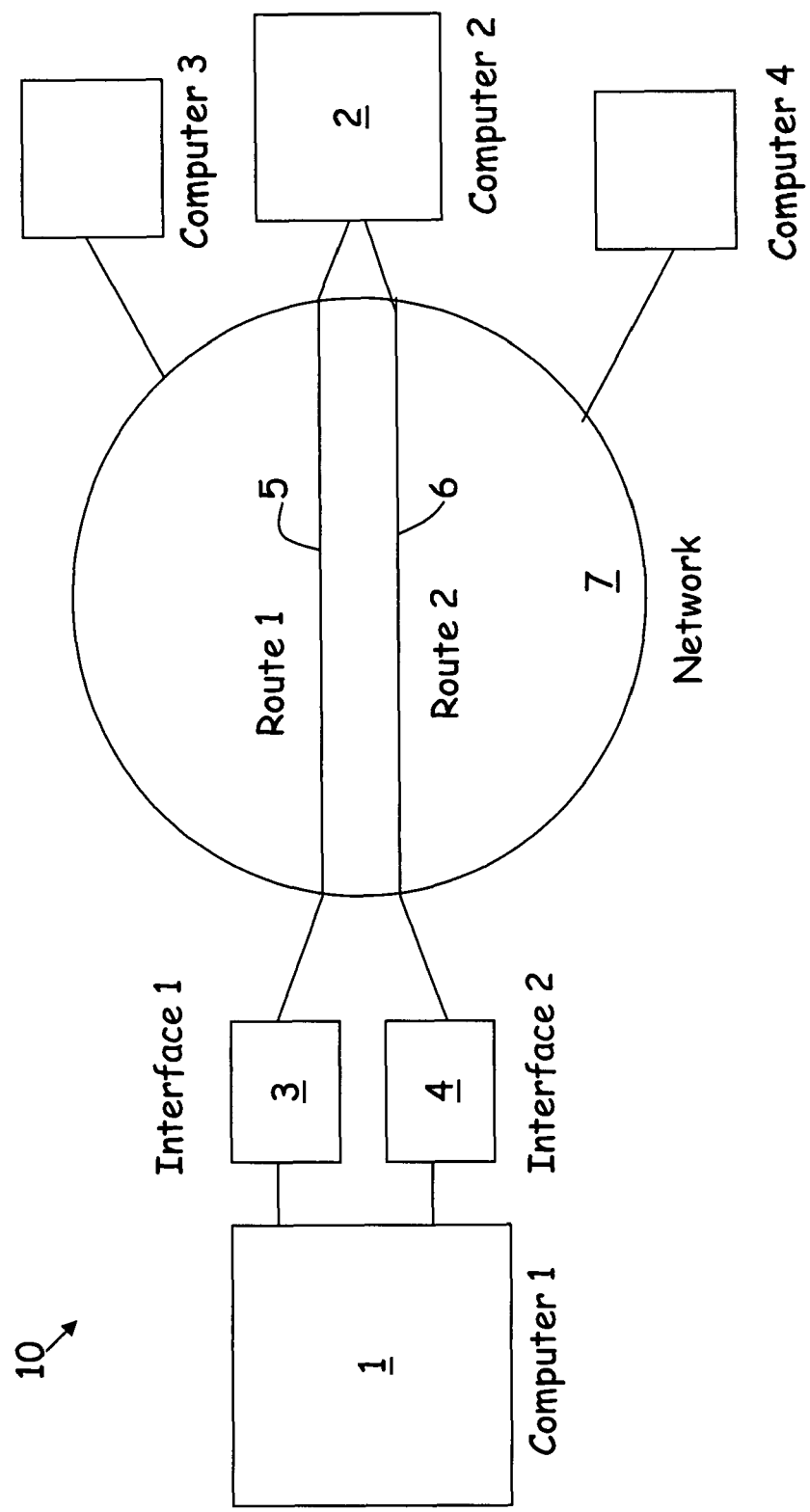

Applicants have appreciated that prior techniques for selecting a network interface suffer from disadvantages. As discussed above, one prior technique for selecting a network interface is to choose an available interface that advertises that it can provide the highest data rate. For example, an Ethernet network adapter interface may advertise that it is available and capable of providing a high data rate, and a cellular data network adapter interface may advertise that it is available and capable of providing a lower data rate. According to prior techniques for selecting the best available interface, the Ethernet interface would be selected because it advertises that it is capable of providing better performance than the cellular data interface. However, in some circumstances, connecting via the cellular data interface may actually provide better performance, as the interface speed itself does not take into account factors beyond the interface that may affect network performance. For example, the Ethernet connection may provide a connection to a server of an internet service provider (ISP). However, if the ISP is currently unable to provide a high quality of service, a connection made through the Ethernet connection may be relatively slow. The computer may experience better performance by connecting using the cellular data interface which may provide a network connection through a different ISP that may provide better service. Accordingly, Applicants have appreciated that factors besides the interface speed may limit the performance that can be achieved by a connection. Thus, in some embodiments, different and/or additional criteria may be used for selecting the interface to be used for a connection. For example, the performance of previous connections as a whole may be taken into account rather than just the capabilities of a network interface.

In some embodiments, an interface may be selected based on historical information about the performance of previous connections through the available interfaces. Such historical information may include any of a variety of factors, such as the round-trip time, the connection data rate, the connection loss rate, the hop count for the connection and/or any other suitable information. The computer may record historical information about such connection parameters when connections are established, and may access this historical information to make a decision about which interface to use for a new connection. Such historical information may not be limited to the performance of the interfaces themselves, but may in addition to or instead reflect the performance of the connection as a whole. If an interface has recently provided good performance for a network connection to a particular network location, it may be assumed that the interface may continue to provide good performance to that network location and to locations nearby. Under those circumstances, such an interface may be selected over a faster interface which may have provided inferior service to a similar network location. Suitable historical information about previous network connections may be used to select an interface that is more likely to provide good performance in the future. In some embodiments, such a solution may advantageously be implemented by the computer itself based on historical information about previous network connections.

FIG. 1 illustrates an example of a computing environment 10 in which embodiments may be implemented. Computing environment 10 includes a first computer 1 and a second computer 2 to which computer 1 may establish a connection via network 7. Computers 1 and 2 can be computers of any suitable type, and network 7 can be a network of any suitable type, as the techniques described herein are not limited in these respects. First computer 1 may be in communication with a first interface 3 and a second interface 4 which may enable computer 1 to exchange information with devices via network 7. If computer 1 is connected to computer 2 through interface 3, communication may take place via a first route 5 through network 7. If computer 1 is connected to computer 2 through interface 4, communication may take place via a second route 6 through network 7. Routes 5 and 6 may experience different performance.

Although only two interfaces are illustrated in FIG. 1, the techniques described herein are not limited to this example as additional interfaces may provide access to network 7, and these techniques may be extended to these additional network interfaces. A network interface may be part of a computer or separate from a computer. For example, a computer may have a built-in network interface in the form of a network interface card (e.g., a built-in wireless NIC or Ethernet NIC) which is a part of the computer. Alternatively, an interface may be separate from a computer, and may communicate with the computer via a local data bus (e.g., a serial or parallel bus) to provide access to another device via a network. Any suitable type and configuration of network interface may be used, as the techniques described herein are not limited in this respect.

Computer 1 may subsequently attempt to establish a new connection to computer 2 through interface 3, interface 4 or some other interface. In some embodiments, computer 1 may select the interface to use based on historical information about the performance of previous connections that have been established (e.g., via interfaces 3 and 4 in the example of FIG. 1). Such historical information may enable the computer to take into account the effect of interface selection upon the route (e.g., route 5 or 6) that is taken through the network. As one example, interface 3 may be capable of providing a much higher data rate than interface 4. Selecting interface 3 might lead to communications being routed through route 5 through network 7. However, if route 5 is slower than route 6, then choosing interface 4 may provide better overall performance than choosing interface 3. In some embodiments, historical information about previous connections made through interfaces 3 and 4 may allow the computer to make an educated prediction about which interface is likely to provide a connection with better performance.

Any suitable historical information may be considered. As one example, the historical information may include information about the round-trip time (RTT) for a previous network connection. When computer 1 sends a packet to computer 2, there may be a delay before computer 2 receives the packet. Once computer 2 receives the packet, computer 2 may send a response to computer 1. For example, computer 1 may send an acknowledgment packet to acknowledge the receipt of the packet sent by computer 1. The RTT may be an amount of time it takes from the time a communication is sent by computer 1 until a response is received by computer 1. A smaller RTT may be preferred because a smaller RTT may enable a connection to provide better performance. The RTT may be affected by a variety of factors, such as the distance between the computers, the speed of computer 2 and/or the speed of the route that is taken through the network.

As another example, the historical information may include information about the data rate that has been achieved by a past connection. As with RTT, the data rate may be affected by a variety of factors such as the speed of the route that is taken through the network. As yet another example, the historical information may include information about the loss rate for a connection. When sending data over a network, a packet may not always reach its destination, and sometimes may reach its destination in corrupted form. When this occurs, the packet is said to be lost, and the packet may need to be re-transmitted. The loss rate for a connection represents the rate at which packets are lost for a given connection. As a further example, the historical information may include information about the "hop count" which is the number of steps that are taken through the network for data to reach its destination. When data is routed through a connection, the data may need to pass through multiple steps, each of which may include a device (e.g., switch, router or gateway) which may forward the data along. If the hop count is relatively large, the data may need to pass through a large number of routers which may slow down a connection, and may present a larger chance for the connection to fail.

The above are merely examples of parameters that may be measure to determine performance of a connection, and it should be appreciated that the invention is not limited to using these, as any suitable historical connection information may be used for interface selection.

Figure 2:
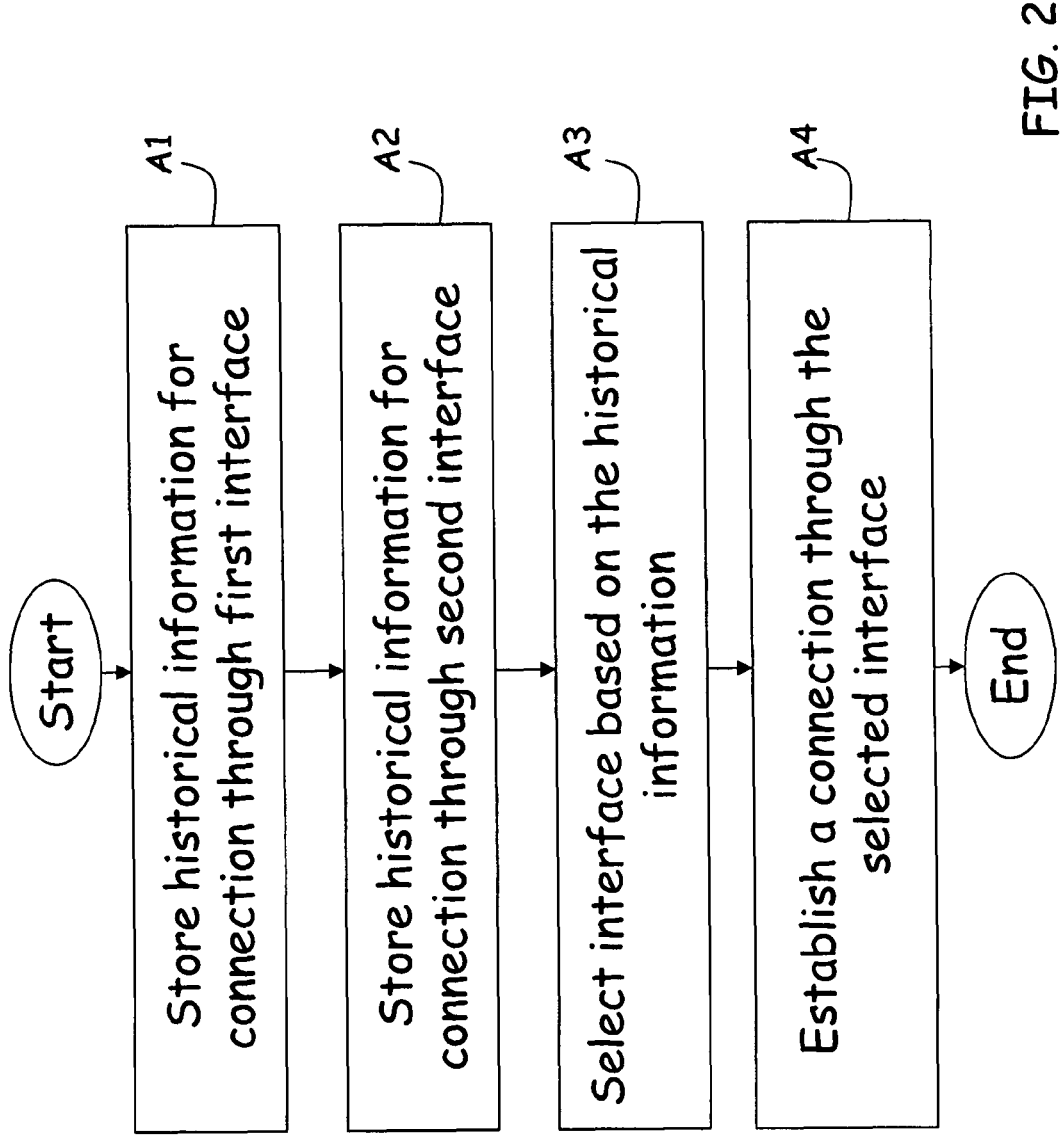
FIG. 2 is a flowchart illustrating a method of communicating over a network, according to some embodiments.

FIG. 2 is a flowchart illustrating a method of communicating over a network, according to some embodiments. As discussed above, historical connection information may be saved by a computer for future use in selecting an interface. In act A1, a computer may store historical connection information about a connection that has been established through a first interface. This can be done in any suitable way, for example, when the computer establishes a connection through the first interface to a network, the computer may store information about the connection. This information may be obtained from any source. The computer itself could measure a connection information and/or could receive connection information from another device. For example, the connection information could be received from another device that measures connection information. The computer could store the historical connection information locally in memory, or this information could be stored elsewhere. For example, the information may be stored by the device that measures the information and obtained by the computer later prior to selecting an interface. The historical connection information may include any suitable performance-related information about the connection, examples of which are discussed above. In some embodiments, the historical connection information may be associated with the network address of the device to which the computer connected, and the network address and historical connection information may be stored together. In one example, act A1 may be performed by computer 1 for a connection established to computer 2 via interface 3. However, this is just an example, as act A1 may be performed in any suitable way.

In act A2, a computer may store historical connection information about a connection that has been established through a second interface different from the first interface. The historical connection information may represent performance-related information about a connection made through the second interface. In some embodiments, the historical connection information that is stored in act A2 may be the same type of information stored in the act A1, thus allowing different connections to be compared based on the same criteria. Alternatively, different types of historical connection information may be stored for different connections, as the techniques described herein are not limited in this respect. As discussed above with respect to act A1, the historical connection information may be measured by the computer or by a different device, and may be stored locally on the computer or in another location. In one example, act A2 may be performed by computer 1 for a connection established to computer 2 via interface 4. However, this is just an example, as act A2 may be performed in any suitable way.

As a result, historical connection information may be saved for connections through different interfaces. In some embodiments, acts A1 and A2 may be repeated multiple times so that a computer may build a dataset of historical connection information for connections to multiple different devices. For example, connection information may be measured and saved periodically while a connection is established. The interval between measurements may be chosen to be approximately equal to the RTT the connection, for example, and measurements may be also be made when the RTT changes. However, connection information need not be measured or saved periodically, and could be performed in a different manner. Any suitable raw connection measurement and/or derived connection information may be stored for one or more connection parameters. If a computer has access to more than two network interfaces, historical connection information may also be stored for any of these additional interfaces, if desired.

At some point, a computer may wish to establish a new network connection. To select a network interface, the computer may make a decision in act A3 based at least in part on the historical connection information saved in acts A1 and A2. Such historical connection information may be used in a variety of ways. As one example, the decision may be made based on one type of historical connection information, such as the best data rate. As another example, the decision may be made based on a combination of different historical connection parameters. If multiple parameters are used, each parameter may be weighted according to its relative importance to connection quality. An interface may be chosen that is likely to provide better performance, as measured by the weighted parameters. The parameters used and the weights give can be chosen in any suitable way, as the invention is not limited to any particular parameters or weighting.

In some embodiments, multiple measurements of a single connection parameter may be used for interface selection. For example, a statistical function or other mathematical function may be performed upon a plurality of measurements of a single parameter such that one or more mathematically-generated connection parameters are determined. As one particular example, an average connection parameter may be determined based upon multiple measurements of the connection parameter that have been made over time, such that the most recent measurements for over a particular time period are used. More recent measurements may be given more weight than older measurements, for example. However, the techniques described herein are not limited as to the method of weighting multiple measurements or the particular function that is employed to determine such a mathematically-generated parameter.

In some embodiments, a subset of the available historical connection information may be used for the selection of an interface. For example, if a new connection is to be established to a computer having a particular network address, historical connection information may be considered for previous connections that were made to computers that had similar network addresses, as the inventors have appreciated that computers with similar addresses tend to be located in a similar physical location. Similarity of addresses can be determined in any suitable way, as the techniques described herein are not limited to any particular technique for determining similarity. One analogy that can be made is with respect to telephone numbers, which may have the same area code for telephone numbers who's "home address" is in the same area. The same may be true for internet protocol (IP) addresses, as computers that are located near each other may have addresses with the same prefix. Thus, there may be a statistical correlation between IP address prefixes and physical proximity. In some circumstances, connection parameters may be similar when connecting to devices that are physically close to one another. As a result, connections made to devices having similar IP prefixes may be of a similar quality, and may have similar connection performance characteristics. Thus, in some embodiments, when a new connection is desired to be established to a particular IP address, an interface may be selected based on historical data for connections to similar IP addresses. In some embodiments, similar IP addresses may include IP addresses that are exactly the same, which represents a connection to the same network location. In internet protocol version four (IPv4), similar addresses may include IP addresses that have the same first three bytes or the same first two bytes, for example. In IPv6, similar addresses may include IP addresses having the same first eight bytes, the same first seven bytes, the same first six bytes, or the same prefix having any other suitable length. Any suitable prefix length may be chosen for computers that have similar IP addresses, as the techniques described herein are not limited to the particular size of IP address prefix that is compared.

In response to selecting an interface in act A3, a connection may be established in the act A4 such that communication via the connection takes place through the selected interface. Any suitable type of connection may be established, as the techniques described herein are not limited as to the particular protocol that is used for connections. One example of a suitable connection is a transmission control protocol (TCP) connection, however other types of connections may be established.

For the computing environment illustrated in FIG. 1, computers 1 and/or 2 may be any suitable types of computers, such as the computer described in further detail below. For example, computers 1 and/or 2 may be desktop computers, laptop computers, cellular telephones, personal digital assistants or any other suitable type of computing device. Interfaces 3 and 4 may be any suitable interfaces that enable computer 1 to access network 7. Interfaces 3 and 4 may be network adapters that are in communication with a processor of computer 1 via a wired bus, for example. Examples of suitable interfaces include wired NICs, such as Ethernet cards, telephone modems, DSL cards, etc. Examples of suitable interfaces also include wireless NICs, such as NICs capable of communicating via Bluetooth, IEEE Standard 802.11, cellular data protocols, and/or any other suitable type of NICs. Network 7 may be any suitable computer network such as the Internet, an intranet and/or any other suitable type of network, as the techniques described herein are not limited in this respect.

Figure 3:
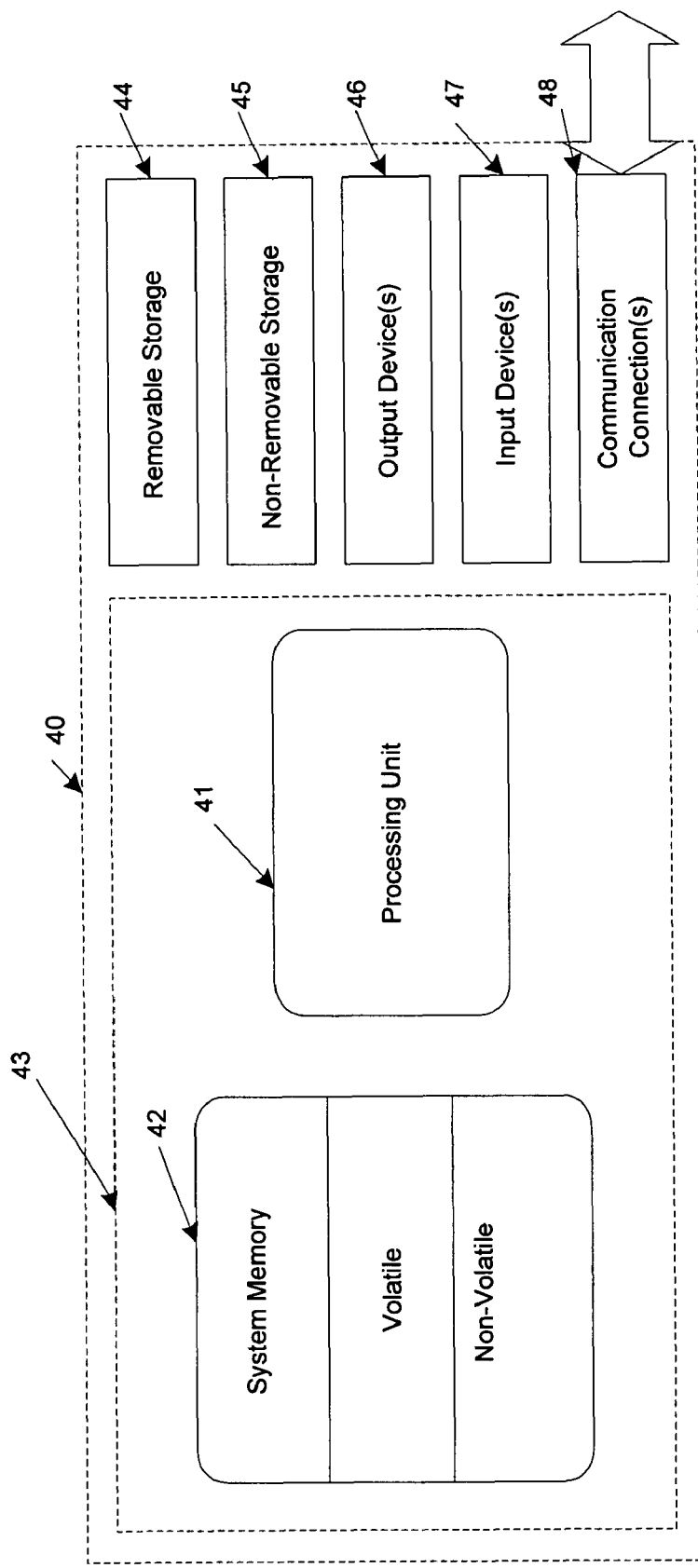
FIG. 3 illustrates an exemplary computer on which embodiments may be implemented.

A computing system will now be described, on which embodiments of the invention may be implemented. With reference to FIG. 3, an exemplary system on which embodiments of the invention may be implemented includes a computing device, such as computing device 40, which may be a device suitable to function as one or more of computers 1 and 2, for example. Computing device 40 may include at least one processing unit 41 and memory 42. Depending on the exact configuration and type of computing device, memory 42 may be volatile, non-volatile or some combination of the two. One possible configuration is illustrated in FIG. 3 by dashed line 43. Additionally, device 40 may also have additional features/functionality. Memory 42 is a form of computer-readable media that may store information such as computer-readable instructions, which, when executed, implement any of the techniques described herein.

Device 40 may include at least some form of computer readable media. Computer readable media can be any available media that can be accessed by device 40. By way of example, and not limitation, computer readable media may comprise computer storage media and communication media. For example, device 40 may also include additional storage (removable and/or non-removable) including, but not limited to, magnetic or optical disks or tape. Such additional storage is illustrated in FIG. 3 by removable storage 44 and non-removable storage 45. Computer storage media includes volatile and nonvolatile, removable and non-removable media implemented in any method or technology for storage of information such as computer readable instructions, data structures, program modules or other data. Memory 42, removable storage 44 and non-removable storage 45 are all examples of computer storage media.

Device 40 may also include output device(s) 46, input device(s) 47 and/or one or more communication connection(s) 48. Communication connection(s) 48 may include, for example, a bus interface that enables device 40 to communicate with a network interface via any suitable data bus, such as a parallel bus or a serial bus.

It should be appreciated that the invention is not limited to executing on any particular system or group of systems. For example, embodiments of the invention may run on one device or on a combination of devices. Also, it should be appreciated that the invention is not limited to any system or network architecture.

Example 1

One detailed example of an application of the techniques described herein will now be described. However, this is just an example, and the invention is not limited to this particular application, as the techniques described herein may be used in numerous other applications.

In some embodiments, an interface may be chosen to achieve the highest bandwidth at layer four of the OSI network communication module. Since bandwidth achieved on a particular route may be measured, past performance may be used to make more informed decisions about future interface selection. Below is describe an example of a solution based on end-to-end bandwidth measurements from the past to make route selection.

1. Each off-link route may maintain two bandwidth values: near (corresponding to bandwidth measurement from TCP connections to "nearby" hosts) and far bandwidth (corresponding to bandwidth measurement from TCP connections to hosts which are not "nearby"). For routes to destinations on the same subnet, there may be only one value of measured bandwidth.
2. Initially, the near and far bandwidths may be set to values derived based on interface speed reported by the NICs. Until sufficient information has been reported on bandwidth by TCP connections, bandwidth values based on interface speed are used. Sufficient information may be obtained by storing connection information for at least 5 connections to 5 different destinations, in some embodiments.

3. For each TCP connection, bandwidth obtained may be measured and reported to IP layer as follows:
   a. The bandwidth sample may be taken and reported to the IP layer by the TCP layer if
      i. a) The sender is efficiently filling the pipe (sends at least 50% of what he is allowed to send) or b) The sender is congestion limited. (Loss, delay spikes, reordering etc).
      ii. For receiver bandwidth, samples may be provided if autotuning is enabled or 75% of receive window we get every RTT-efficient receiver.
      iii. The sample may be passed to the IP layer and tracked on a per-route basis, separating the measurement into subsets or "buckets," such as near and far buckets:

$$AvgBW=AvgBW+(Sample-AvgBW)/N,$$

N for each case may be chosen based on testing and experimentation (e.g., 8).
   Note that this algorithm may not differentiate the direction of transfer; sender and receiver samples are treated alike and are not summed. So if the data transfer is happening simultaneously, its estimates will be more conservative.

4. For each route, bandwidth information obtained may be categorized into the near or the far bucket. To do so, the destination IP address for which the bandwidth is reported is used. This may done as follows:
   a. All destinations whose IP address match the IP address of the host under the subnet mask of the host left shifted by 8 (for IPv4) or 16 (for IPv6) may be considered near.
   b. For destinations not meeting criteria (a), RTT value or hop count may be used as follows. If the RTT to the destination is below a threshold (e.g., 10 milliseconds) or hop count is less than a threshold (e.g., 6), the destination is treated as near. Further, for future connections, all destinations that match a near destination under the subnet mask of the host left shifted by 8 (for IPv4) or 16 (for IPv6) may be considered near. To do this, the computer may maintain a list of near IP address ranges.
   c. Any IP address that does not belong to near or is on subnet is considered far.

5. For a destination to which a new TCP connection is to be established, the destination IP may first be categorized into near vs. far and then various routes from the route lookup that match may be compared based on average near or far bandwidths for those routes. The route with the higher average bandwidth may be selected.

|         | Near BW | Far BW |
|---------|---------|--------|
| Route 1 | X1      | X2     |
| Route 2 | Y1      | Y2     |

For a near destination, it route 1 and 2 are matching routes, X1 and Y1 may be compared while for a far destination, X2 and Y2 may be compared 6. The average far bandwidth for a particular route may be upper bounded by the average near bandwidth for that route.
7. To increase stability, hysteresis may be introduced by bucketizing average bandwidth into few buckets. An average bandwidth may be categorized into a different bucket only if it crossed the bucket threshold by over 25%.
8. After a period of time (say 2 hrs) if no new bandwidth samples have been reported for a route, the average bandwidth for that route may be reset to based on interface speed as in 1.

The state maintained in section 3 above may purged when a machine reboots. On sleep/wake-up or media disconnect/re-connect, the state may be purged if any IP address assigned to the interface is different (since a different IP address indicates connectivity to a different network and hence, likely to result in different performance).

The above algorithm may load balance TCP connections across interfaces that fall into the same bucket based on interface speed; e.g., if a large number of TCP connections start going over one interface such that the average throughput for each connection is reduced to below what is achievable over the other interface, then the above algorithm may automatically detect that and start routing new TCP connections over the other interface.

Below is a description notifications that may be provided to applications that maintain long-lived connections:

NetBT/RDR client: on some operating systems, a NetBT/RDR client may attempt to connect using the NetBT protocol (over port 138/139) as well as using the SMB protocol (using port 445). Connectivity using NetBT may be tried over all the available interfaces and then the interface that connects first may be picked. This is independent of the TCP/IP stack. Due to this behavior, NetBT may actually end up picking a slower interface and not taking the benefit of improvement in TCP/IP to select the best interface.

To address this issue, in some embodiments the computer may attempt to connect over port 445 first (which may end up using TCP/IP routing preference), failing which it may fall back to 138/139 ports which tries connectivity over all interfaces. To do this, SMB may prioritize TCP/IP connections by delaying issuance of NetBT connections by 0.5 s.

NetBT may maintain long-lived connections which are shared across multiple data transfers from/to the same host. This may causes stickiness as to which interface gets picked even after a computer (e.g., a laptop) is docked especially due to strong host behavior since the routing is based on the source address as well, which gets specified when the connection was initially established. In addition, an operating system may implement a feature known as fast reconnect which re-establishes a TCP connection after media disconnect/connect (e.g., during sleep/wakeup) without tearing it down. This means that a machine may be put in sleep mode and connected via another interface before wake up may continue to pick the previous interface independent of routing metric.

To address the long-lived connections issue, in some embodiments a solution at the TCP layer may involve TCP migration which is out of scope of this feature. A solution at the application layer is possible however. SMB may perform the following:
1. Register for media connect/disconnect notifications
2. On a media connect notification; query the stack if a better interface is available.
3. If a better interface is available, tear down all connections that can be torn down (i.e., no active file open) and that have been inactive for a period of time

Having now described some embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. The foregoing description and drawings are by way of example only. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. The use of "including," "comprising," or "having," "containing," "involving," and variations thereof herein, is meant to encompass the items listed thereafter and equivalents thereof as well as additional items.

What is claimed is:

1. In a computing environment including a first host computer configured to communicate via a network through a first network interface apparatus of the host computer and a second network interface apparatus of the host computer, the network enabling the first host computer to communicate with a plurality of other host computers via the network, a method comprising acts of:
   (A) measuring, during a first network connection between the first host computer and at least one of the plurality of other host computers through the first network interface apparatus, first historical network connection information indicating measured performance of the first network connection;
   (B) prior to terminating the first network connection, storing, by the first host computer, the first historical network connection information;
   (C) measuring, during a second network connection between the first host computer and at least one of the plurality of other host computers through the second network interface apparatus, second historical network connection information indicating measured performance of the second network connection;
   (D) storing, by the first host computer, the second historical network connection information;
   (E) after terminating the first network connection, selecting, based on at least the first and second historical network connection information, a selected network interface apparatus from among the first and second network interface apparatuses to use for a third network connection; and
   (F) based on the act (E), establishing the third network connection between the first host computer and a second host computer from among the plurality of other host computers such that third network connection communication passes through the selected network interface apparatus.

2. The method of claim 1, wherein the first network interface apparatus and the second network interface apparatus operate according to different network communication protocols.

3. The method of claim 1, wherein the first network interface apparatus and the second network interface apparatus provide access to the network through different types of communication media.

4. The method of claim 3, wherein the different types of communication media comprise a wireless medium and a wired medium.

5. The method of claim 1, wherein the act (E) is performed by the first host computer and the first host computer initiates the act (F) in response to the act (E).

6. The method of claim 1, wherein the first network connection is between the first host computer and a third host computer from among the plurality of other host computers, wherein a network address of the third host computer is similar meets a criterion of similarity to a network address of the second host computer, and wherein the selected network interface apparatus is selected to be the first network interface apparatus based in part on a similarity of the network addresses of the second and third host computers.

7. The method of claim 6, wherein the address of the third host computer and the address of the second host computer have a same prefix.

8. The method of claim 6, wherein the third host computer has a physical location that is close to a physical location of the second host computer.

9. The method of claim 1, wherein at least a portion of the first historical network connection information represents a hop count for the first network connection, and wherein the selected network interface apparatus is selected to be the first network interface apparatus based at least in part on the hop count.

10. The method of claim 1, wherein at least a portion of the first historical network connection information represents a round-trip time for the first network connection, and wherein the selected network interface apparatus is selected to be the first network interface apparatus based at least in part on the round-trip time.

11. The method of claim 1, wherein at least a portion of the first historical network connection information represents a data rate for the first network connection, and wherein the selected network interface apparatus is selected to be the first network interface apparatus based at least in part on the data rate.

12. The method of claim 1, wherein at least a portion of the first historical network connection information represents a packet loss rate for the first network connection, and wherein the selected network interface apparatus is selected to be the first network interface apparatus based at least in part on the packet loss rate.

13. The method of claim 1, wherein the selected network interface apparatus provides a higher overall connection data rate than a non-selected network interface apparatus of the first and second network interface apparatuses would provide.

14. The method of claim 1, wherein the first historical network connection information comprises round-trip time of the first connection, a data rate of the first connection, a loss rate of the first connection, or a hop count of the first connection, and wherein the second historical network connection information comprises round-trip time of the second connection, a data rate of the second connection, a loss rate of the second connection, or a hop count of the second connection.

15. In a computing environment including a first computer configured to communicate via a network through a first network interface and a second network interface, the network enabling the first computer to communicate with a plurality of other computers via the network, a computer readable storage medium having instructions which, when executed, perform a method comprising acts of:

(A) storing, by the first computer, historical network connection information representing a performance of a plurality of network connections between the first computer and at least one of the plurality of other computers through the plurality of network interfaces, the historical network connection information comprising, for each available route from the first computer, at least one first value representing performance of at least one network connection between the first computer and at least one second computer of the plurality of other computers, and at least one second value representing performance of at least one network connection between the first computer and at least one third computer of the plurality of other computers, wherein the at least one second computer is closer in network address than the at least one third computer to the first computer;

(B) determining whether a fourth computer of the plurality of other computers meets a criterion of nearness to the first computer;

(C) selecting, based on at least the historical network connection information, a selected network interface from among the plurality of network interfaces to use for a network connection between the first computer and the second computer, wherein the selecting comprises:

if it is determined that the second computer meets the criterion of nearness to the first computer, selecting the selected network interface based at least in part on the first value of the historical network connection information, and if it is determined that the second computer does not meet the criterion of nearness to the first computer, selecting the selected network interface based at least in part on the second value of the historical network connection information; and (D) based on the act (C), establishing the network connection between the first computer and the second computer such that communication between the first computer and the second computer passes through the selected network interface.

16. The computer readable medium of claim 15, wherein determining whether the second computer meets the criterion of nearness to the first computer comprises comparing a predetermined number of high-order bits of IP addresses of the first computer and the second computer and, if the predetermined number of high-order bits match, determining that the second computer meets the criterion of nearness to the first computer.

17. A system, comprising:
a computer;
a first network interface apparatus that enables the computer to communicate with a plurality of other computers via a network; and
a second network interface apparatus that enables the computer to communicate with a plurality of other computers via the network;
wherein the computer comprises:
at least one storage device storing first historical network connection information comprising a first round-trip time measured from a first network connection between the computer and at least one of the plurality of other computers through the first network interface apparatus, and second historical network connection information comprising a second round-trip time measured from a second network connection between the computer and at least one of the plurality of other computers through the second network interface apparatus;
a processor that determines, after the first network connection is terminated, based on the first and second round trip times, which of the first and second network interface apparatuses to use for a third network connection to be established with at least one of the plurality of other computers.

18. The system of claim 17, wherein the first and second network interface apparatuses are part of the computer.

19. The system of claim 17, wherein the computer further comprises:
at least one wired bus coupled to the processor;
wherein the first network interface apparatus is a network adapter in communication with the processor via the at least one wired bus.

20. The system of claim 17, wherein the first network interface apparatus is a wired network adapter and the second network interface apparatus is a wireless network adapter.

* * * * *